(12) United States Patent
Tordera et al.

(10) Patent No.: US 6,975,644 B2
(45) Date of Patent: *Dec. 13, 2005

(54) DUAL INTERFACE WIRELESS IP COMMUNICATION DEVICE

(75) Inventors: Virgil Flores Tordera, Chula Vista, CA (US); Satoru Yukie, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 441 days.

This patent is subject to a terminal disclaimer.

(21) Appl. No.: 09/833,490

(22) Filed: Apr. 12, 2001

(65) Prior Publication Data

US 2003/0086433 A1 May 8, 2003

(51) Int. Cl.[7] .............................................. H04L 12/66
(52) U.S. Cl. ..................... 370/463; 710/313; 455/575.1
(58) Field of Search ................................ 370/419, 328, 370/338, 310, 465; 710/313; 455/78, 573, 455/575.1, 157.2; 711/104

(56) References Cited

U.S. PATENT DOCUMENTS 6,252,952 B1 * 6/2001 Kung et al. .................. 379/114
6,476,825 B1 * 11/2002 Croy et al. ................... 345/716
6,633,759 B1 * 10/2003 Kobayashi ................... 455/419

* cited by examiner

*Primary Examiner*—Duc Ho
(74) *Attorney, Agent, or Firm*—John L. Rogitz

(57) ABSTRACT

A communication interface device includes a wireless Internet packet (IP) transceiver and a flash memory card electrically connected to the transceiver. Also, a universal serial bus (USB) connector is plugged into a hub that holds the flash memory card, with a cord extending from the USB connector and terminating in another USB connector. Accordingly, the flash memory card of the device can be engaged with a slot of a user terminal or, if a user terminal has no slot, the USB connector is engaged with a USB receptacle of the user terminal, to establish wireless communication between the terminal and a base station of a wireless LAN/WAN.

52 Claims, 2 Drawing Sheets

WIRELESS IP COMMUNICATION INTERFACE DEVICE

MEMORY CARD

DUAL INTERFACE WIRELESS IP COMMUNICATION DEVICE

BACKGROUND OF THE INVENTION

1. Field of the Invention

The present invention relates generally to wireless Internet Packet (IP) communication devices having more than one interface format.

2. Description of the Related Art

Networked computing is a powerful tool for business and personal use. With it, the user of a user terminal that communicates with a network such as a company's local area network (LAN) or a wide area network (WAN) can access and share data with other terminals in the network.

Most LAN/WANs are implemented by wired connections, i.e., by requiring that the computers in a network be attached to the network by means of wires. For convenience and to permit easy movement of user terminals within the Network, wireless Networks have been introduced, in which network communication is established via a wireless radiofrequency (rf) or infrared (IR) link.

As recognized by the present invention, a wireless communication interface can be established by connecting an interface component to a user terminal such as a laptop computer or personal computer. Once connected, the interface component can be used to transfer data via the wireless link between the user terminal and the network.

As also recognized herein, an interface component must be mechanically configured to engage the user terminal and electrically configured to communicate via the particular wireless link being used. Unfortunately, some potentially preferred interface components, such as flash memory devices exemplified by the present assignee's Memory Stick® device which are configured for engaging a small slot in a small computer such as a Sony palmtop computer (which small devices might be too small to support a conventional personal computer memory card interface architecture (PCMCIA) slot), might not be engageable with PCs without an adaptor. This is because many PCs do not have slots configured for receiving flash memory devices. Accordingly, the present invention understands that a separate interface component that would include a mechanical connection such as a flash memory card adaptor or a universal serial bus (USB) connector would be required to interface such PCs with the wireless link.

The present invention has made the critical observation that while two mechanical connections defining two respective interface formats might be required to link two differently-configured user terminals to a network, many of the electrical components that support wireless link communication would remain the same for each terminal. Thus, making separate interface devices for each type of user terminal in the network is wasteful since common communication components would have to be duplicated in separate devices. This increases manufacturing costs and requires a user of both a network laptop and a network PC to purchase and use separate interface devices, one for each of his network terminals. Having recognized the above-noted problem, the present invention provides the solution disclosed herein.

SUMMARY OF THE INVENTION

A communication interface device includes a wireless Internet packet (IP) transceiver and a flash memory card electrically connected to the transceiver. A universal serial bus (USB) connector is also electrically connected to the transceiver.

In a preferred embodiment, the wireless transceiver operates in a frequency range of between nine kiloHertz and fifty gigaHertz (9 kHz–50 gHz) and more preferably in a range between two thousand three hundred million Hertz and two thousand three hundred ten million Hertz (2300 mHz–2310 mHz), inclusive. The transceiver and flash memory card can be integral with each other to establish a housing, with the USB connector being connected to the transceiver with a cord. Specifically, the USB connector is a first USB connector, and the device includes a second USB connector attached to the cord and detachably engageable with the housing.

A light emitting diode (LED) can be mounted on the housing and operable to indicate whether the transceiver is communicating with a base station, and to indicate other events. For the same purpose, an audio speaker or beeper can be mounted on the housing.

If desired, a battery can be included in the housing, and an audio or visual indication of a low voltage condition of the battery can be provided. A charger port can also be on the housing and electrically connected to the battery to provide for recharging the battery. Also, a directional antenna can be detachably mounted on the housing and electrically connected to the transceiver.

In another aspect, a wireless communication device for providing at least two communication interfaces includes an antenna. A first computer communication interface component is electrically associated with the antenna, with the first computer communication interface component defining a first interface format. Moreover, a second computer communication interface component is electrically associated with the antenna, and the second computer communication interface component defines a second interface format. Accordingly, the device can be used to establish wireless communication between a user terminal and a base station using one of the interface formats.

In still another aspect, a device for effecting wireless communication between a user terminal and a base station includes wireless transmitting means, and first communication interface means engageable with a user terminal for communicating IP data from the user terminal to the base station using the wireless transmitting means. Additionally, second communication interface means are attached to the first communication interface means and are engageable with a user terminal for communicating IP data from the user terminal to the base station using the wireless transmitting means.

In another aspect, a logic device usable by a user terminal determines whether a first or second computer communication interface component is engaged with the terminal. If a computer communication interface component is engaged with the terminal, the logic device determines whether the first computer communication interface component is engaged with the terminal. If it is, a device driver module associated with the first computer communication interface component is invoked. Otherwise, a device driver module associated with the second computer communication interface component is invoked. The logic device can be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
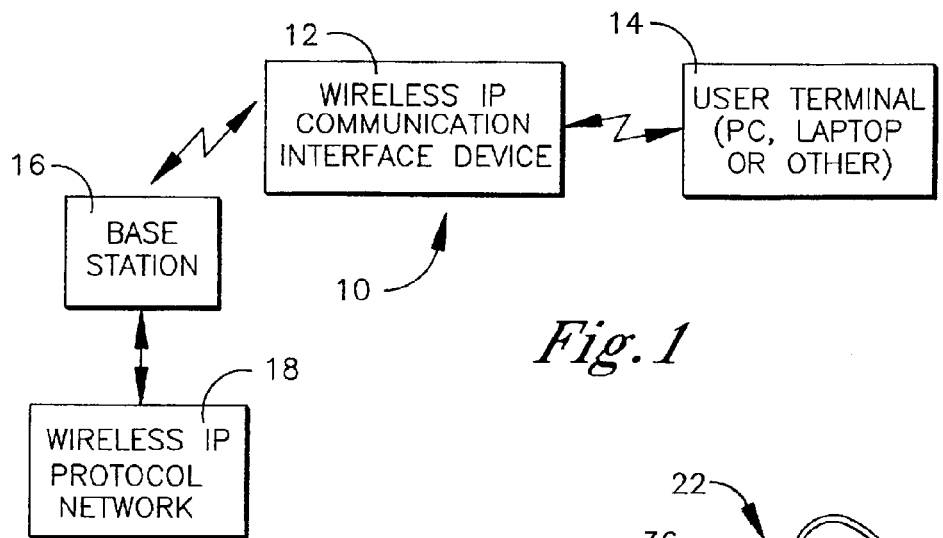
FIG. 1 is a schematic diagram showing the system architecture of the present invention.

Referring initially to FIG. 1, a system is shown, generally designated 10, that includes a communication interface device 12 engageable with a user terminal 14 for establishing wireless communication between the terminal 14 and a base station 16 of a wireless network 18. In one non-limiting embodiment used only for illustration purposes, the network 18 can have a broadband Internet packet (IP) data protocol, such as an i-Burst network made by Arraycomm. Such a network can use space division multiple access (SDMA) directional communication principles and has a data transfer rate in excess of one megabyte per second.

Figure 2:
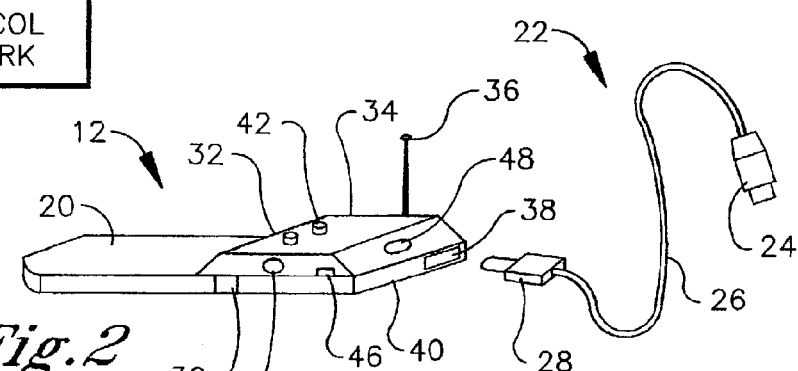
FIG. 2 is an exploded perspective view of a preferred wireless IP communication interface device.

FIG. 2 shows one preferred embodiment of the interface device 12. As shown, the device 12 can include a first computer communication interface component, such as a flash memory card 20, which defines a first interface format. In a particularly preferred but non-limiting embodiment, the flash memory card 20 is a Memory Stick® device made by the present assignee that can hold 4 MB of data, or 8 MB, or 16 MB, or 32 MB, or 64 MB, or more. The Memory Stick® memory card operates at between 2.7v–3.6v and has a writing speed of up to 1.5 megabytes per second and a read speed of up to 2.45 megabytes per second.

Figure 2B:
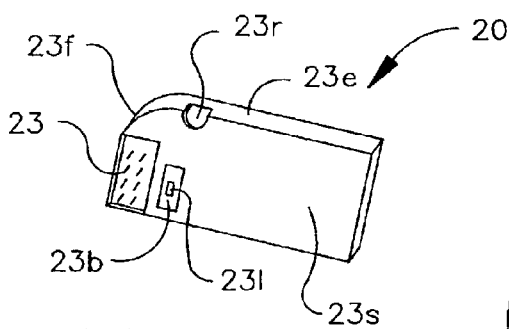
FIG. 2b is a perspective view of one preferred embodiment of the present memory device, showing the bottom of the device.
Figure 2A:
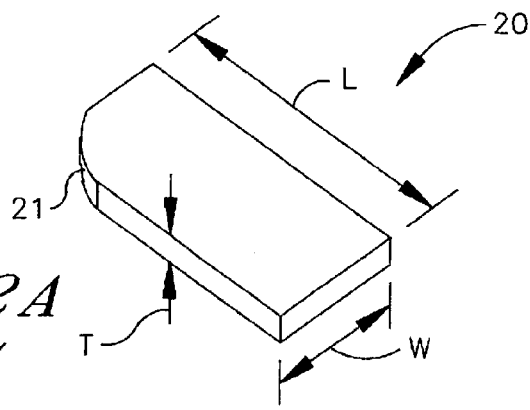
FIG. 2a is a perspective view of one preferred embodiment of the present memory device, showing the top of the device.

Referring briefly to FIGS. 2a and 2b, the preferred card 20 is shaped as a thin parallelepiped, and has a length L of fifty millimeters (50 mm), a width W of twenty one and a half millimeters (21.5 mm), and a thickness T of about two and eight-tenths millimeters (2.8 mm). A left front surface 21 of the preferred card 20 is gently, curvilinearly chamfered relative to the adjacent front and side edges as shown. The card 20 contains flash memory circuitry, and to provide electrical connectivity therewith, ten connectors 23, slightly recessed in a bottom surface 23s, are accessible as shown in FIG. 2b at or near the front edge 23f of the card 20. Also, a semi-circular cutout 23r is formed in a side edge 23e of the card 20 near the front edge 23f. To provide for selectively allowing data to be written and/or deleted onto the flash memory, a lock 23l is slidable in a lock bay 23b of the bottom surface 23s between an unlock position, wherein data can be read from, written to, and deleted from the memory device 20, and a lock position, wherein data can be read from but not written to or deleted from the memory device 20.

Referring back to FIG. 2, the device 12 includes a second computer communication interface component such as a universal serial bus (USB) connector 22 which defines a second interface format. In one preferred embodiment, the USB connector 22 includes a male USB "A" plug 24 having two rows of pins (five pins in one row and four in the other row), with the USB "A" plug 24 being connected via a cord 26 to a USB "B" plug 28. The USB plugs 24, 28 are preferably in accordance with USB 2.0. In alternate embodiments, the second computer communication interface component can be established by a so-called "ILink" connection in accordance with IEEE standard 1394 or even a wireless component such as a so-called "Bluetooth" rf communication device.

In any case, as intended by the present invention both computer communication interface components are electrically associated with a transceiver 30, such as a wireless IP transceiver provided by Arraycomm. Such a transceiver operates in a frequency range of between nine kiloHertz to fifty gigaHertz (9 kHz–50 gHz) and more preferably in a range between two thousand three hundred million Hertz and two thousand three hundred ten million Hertz (2300 mHz–2310 mHz). It is to be understood that the transceiver 30 can be integral to the flash memory card 20. The transceiver 30 with flash memory card 20 establish a housing 32 that can include a raised hub 34 detachably supporting a preferably directional antenna 36.

As shown in FIG. 2, a USB "B" receptacle 38 is formed in the hub 34. Accordingly, the USB "B" plug 28 of the USB connector 22 is configured for mechanically and electrically engaging the receptacle 38. Thus, the USB connector 22 is detachably engaged with the housing 32, but a non-detachable connection can also be used. According to present principles, the transceiver 30 is associated with the antenna 36, such that both computer communication interface components are electrically connected to the antenna 36. It may now be appreciated that the flash memory card 20 can be engaged with a small flash memory card slot (such as a Memory Stick® slot of a Sony computing device) of the user terminal 14 to establish wireless communication between the user terminal 14 and the base station 16 using the first interface format, or, if no slot is available, the USB "A" plug 24 can be engaged with a USB receptacle of the user terminal 14 to establish wireless communication between the user terminal 14 and the base station 16 using the second interface format.

FIG. 2 shows that if desired, a rechargeable battery 40 can be included with the housing 32. Also, one or more light emitting diodes (LED) 42 can be mounted on the housing 34 to indicate whether the transceiver 30 is communicating with the base station 16, and/or to indicate a low voltage condition of the battery, and/or to indicate other events such as power on and so on. Still further, a small audio speaker or beeper 44 can be mounted on the housing to indicate these same or different conditions. It is to be understood that the user terminal 14 can alternatively provide such audible and/or visual indications.

To provide for recharging the battery 40, a charger port 46 configured for receiving a charger plug (not shown) can be formed in the housing and electrically connected to the battery 40. To conserve battery power, a power switch 48 can be provided on the housing 32 and electrically connected to the battery 40 so that a user can selectively connect and disconnect the battery 40 from the remainder of the components in the housing 32.

The chipsets, firmware, or software of the user terminal 14 are configured for operating with the interface device 12. The flow charts herein illustrate the structure of a logic device of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. Internal logic could be as simple as a state machine.

In other words, the present logic may be established as a computer program that is executed by a processor as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 3:
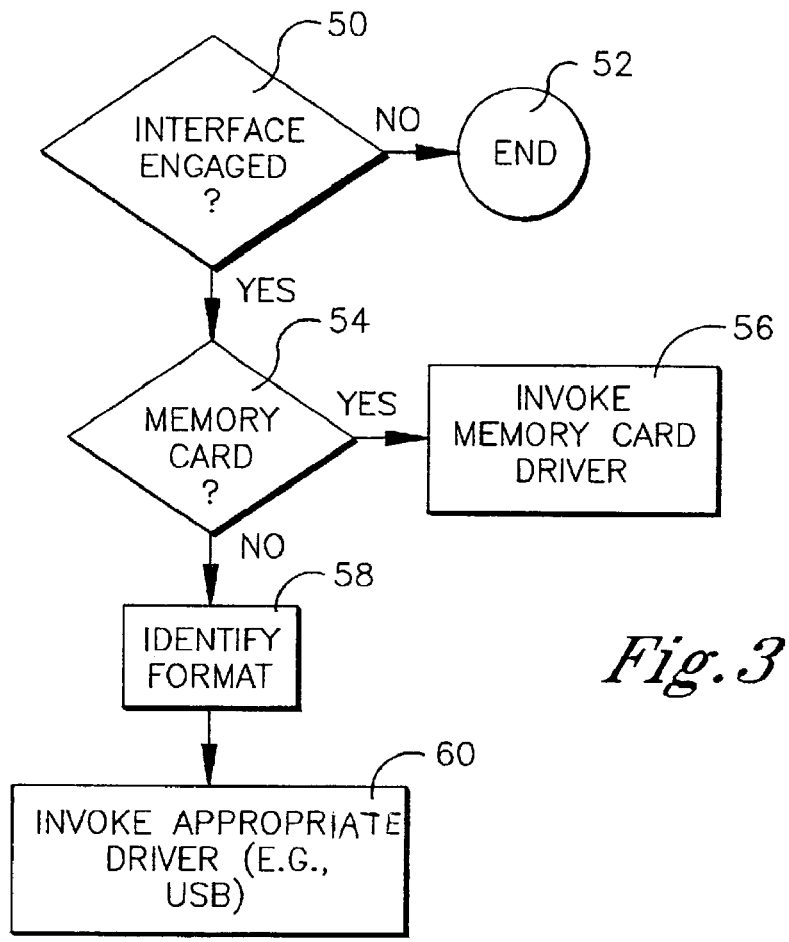
FIG. 3 is a flow chart showing the logic for invoking the appropriate device driver.

FIG. 3 shows that the user terminal 14 can determine, at decision diamond 50, whether the interface device 12 is engaged with the terminal 14. If not, the logic ends at state 52, but otherwise the logic flows to decision diamond 54 to determine whether the flash memory card 20 has been engaged with a corresponding slot on the terminal 14. Of course, for terminals that have no corresponding slot, the step at decision diamond 54 is skipped.

When it is determined that the flash memory card 20 has been engaged with the terminal 14, a flash memory software driver module is invoked at state 56. On the other hand, when it is determined that the device 12 is engaged with the terminal 14 but not via a flash memory, the logic flows to block 58 to identify the format (e.g., USB) and thence to block 60 to invoke the appropriate software driver module.

Figure 4:
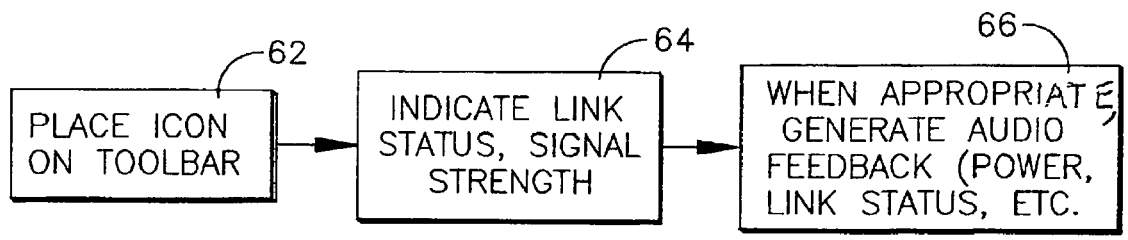
FIG. 4 is a flow chart showing the operating logic of the system.

Once the interface device 12 has been engaged with the user terminal 14, the logic of FIG. 4 can be invoked. Commencing at block 62, an icon representing the device 12 can be placed on the toolbar of the display of the user terminal 14. As mentioned above, at block 64 the display of the terminal 14 can indicate link status, battery 40 status, device 12 power on status, link signal strength, and so on. Audible feedback of these parameters can also be provided by the user terminal 14 at block 66.

While the particular DUAL INTERFACE WIRELESS IP COMMUNICATION DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A communication interface device, comprising:
   at least one wireless Internet packet (IP) transceiver;
   at least one flash memory card electrically connected to the transceiver and configured for engaging a flash memory slot of a computing device; and
   at least one universal serial bus (USB) connector electrically connected to the transceiver, wherein the transceiver and flash memory card are integral with each other to establish a housing separate from the computing device with which the flash memory card can be engaged, wherein the wireless transceiver operates in a frequency range of between two thousand three hundred million Hertz and two thousand three hundred ten million Hertz (2300 mhz–2310 mhz), inclusive.

2. The device of claim 1, wherein the USB connector is connected to the transceiver with a cord.

3. The device of claim 2, wherein the USB connector is a first USB connector, and the device includes a second USB connector attached to the cord and detachably engageable with the housing.

4. The device of claim 1, further comprising at least one light emitting diode (LED) mounted on the housing and operable at least to indicate whether the transceiver is communicating with a base station.

5. The device of claim 1, further comprising at least one antenna supported on the housing and electrically connected to the transceiver.

6. The device of claim 5, wherein the antenna is directional.

7. The device of claim 1, further comprising a base station communicating with the device.

8. The device of claim 1, wherein the wireless transceiver operates in a frequency range of between nine kiloHertz and fifty gigaHertz (9 kHz–50 gHz), inclusive.

9. A communication interface device, comprising:
   at least one wireless Internet packet (IP) transceiver;
   at least one flash memory card electrically connected to the transceiver; and
   at least one universal serial bus (USB) connector electrically connected to the transceiver, wherein the memory card has one and only one chamfered surface.

10. The device of claim 9, wherein the memory card has a length of fifty millimeters (50 mm) and a width of twenty one and a half millimeters (21.5 mm).

11. The device of claim 10, wherein the flash memory card has ten and only ten connectors.

12. The device of claim 11, wherein the memory card has a thickness of about two and eight-tenths millimeters (2.8 mm).

13. A wireless communication device for providing at least two communication interfaces, comprising:
    at least one antenna;
    at least a first computer communication interface component electrically associated with the antenna, the first computer communication interface component defining a first interface format and being a memory device; and
    at least a second computer communication interface component electrically associated with the antenna, the second computer communication interface component defining a second interface format, wherein the device can be removably attached to a user terminal separate from the device to establish wireless communication between the user terminal and at least one base station using one of the interface formats, and a wireless IP transceiver electrically connected to the antenna, wherein the wireless transceiver operates in a frequency range of between two thousand three hundred million Hertz and two thousand three hundred ten million Hertz (2300 mhz–2310 mhz), inclusive.

14. The device of claim 13, wherein the first interface format is a flash memory format and the second interface format is selected from the group of formats comprising: universal serial bus (USB) format, Bluetooth wireless format, and ILink format.

15. The device of claim 13, wherein the first interface format is a flash memory format and the second interface format is a universal serial bus (USB) format.

16. The device of claim 13, wherein the second computer communication interface component includes at least one USB connector, and the USB connector is connected to the transceiver with a cord.

17. The device of claim 16, wherein the USB connector is a first USB connector, and the device includes a second USB connector attached to the cord and detachably engageable with a housing supporting the transceiver.

18. The device of claim 17, further comprising at least one light emitting diode (LED) mounted on the housing and operable at least to indicate whether the transceiver is communicating with a base station.

19. The device of claim 18, further comprising at least one audio speaker on the housing.

20. The device of claim 18, further comprising at least one battery included in the housing.

21. The device of claim 20, further comprising at least one audio or visual indication of a low voltage condition of the battery.

22. The device of claim 20, further comprising at least one charger port on the housing and electrically connected to the battery.

23. The device of claim 13, wherein the wireless transceiver operates in a frequency range of between nine kiloHertz and fifty gigaHertz (9 kHz–50 gHz), inclusive.

24. The device of claim 13, wherein the antenna is directional.

25. The device of claim 13, further comprising a base station communicating with the device.

26. A device for effecting wireless communication between a user terminal and at least one base station, comprising:

wireless transmitting means;

first communication interface and flash memory means engageable with a user terminal for communicating IP data from the user terminal to the base station using the wireless transmitting means; and second communication interface means engageable with a user terminal for communicating IP data from the user terminal to the base station using the wireless transmitting means, the first and second communication interface means being contained on a housing separate from the user terminal wherein the first communication interface and flash memory means is at least one flash memory card, the second communication interface means is at least one universal serial bus (USB) connector, and the wireless transmitting means is at least one wireless Internet packet (IP) transceiver, and wherein the wireless transceiver operates in a frequency range of between two thousand three hundred million Hertz and two thousand three hundred ten million Hertz (2300 mhz–2310 mhz), inclusive.

27. The device of claim 26, wherein the transceiver and flash memory card are housed integrally together to establish the housing.

28. The device of claim 27, wherein the USB connector is connected to the transceiver with a cord.

29. The device of claim 28, wherein the USB connector is a first USB connector, and the device includes a second USB connector attached to the cord and detachably engageable with the housing.

30. The device of claim 29, further comprising at least one light emitting diode (LED) mounted on the housing and operable at least to indicate whether the transceiver is communicating with a base station.

31. The device of claim 30, further comprising at least one audio speaker on the housing.

32. The device of claim 27, further comprising at least one battery included in the housing.

33. The device of claim 32, further comprising at least one audio or visual indication of a low voltage condition of the battery.

34. The device of claim 32, further comprising at least one charger port on the housing and electrically connected to the battery.

35. The device of claim 27, further comprising at least one antenna supported on the housing and electrically connected to the transceiver.

36. The device of claim 35, wherein the antenna is directional.

37. The device of claim 27, wherein the wireless transceiver operates in a frequency range of between nine kiloHertz and fifty gigaHertz (9 kHz–50 gHz), inclusive.

38. The device of claim 26, further comprising a base station communicating with the device.

39. A logic device usable by a user terminal for executing method acts comprising:

determining whether at least a first or second computer communication interface component is engaged with the terminal; and if a computer communication interface component is engaged with the terminal:

determining whether the first computer communication interface component is engaged with the terminal, and if so, invoking a memory device driver module associated with the first computer communication interface component, and otherwise invoking a device driver module associated with the second computer communication interface component, wherein the logic device in combination with a communication device embodying the first and second computer interface components and a wireless IP transceiver, and wherein the wireless transceiver operates in a frequency range of between two thousand three hundred million Hertz and two thousand three hundred ten million Hertz (2300 mhz–2310 mhz), inclusive.

40. The logic device of claim 39, wherein the second computer communication interface component includes at least one USB connector, and the USB connector is connected to the transceiver with a cord.

41. The logic device of claim 40, wherein the USB connector is a first USB connector, and the communication device includes a second USB connector attached to the cord and detachably engageable with a housing supporting the transceiver.

42. The logic device of claim 41, further comprising at least one light emitting diode (LED) mounted on the housing and operable at least to indicate whether the transceiver is communicating with a base station.

43. The logic device of claim 42, further comprising at least one audio speaker on the housing.

44. The logic device of claim 43, further comprising at least one battery included in the housing.

45. The logic device of claim 44, further comprising at least one audio or visual indication of a low voltage condition of the battery.

46. The logic device of claim 39, wherein the wireless transceiver operates in a frequency range of between nine kiloHertz and fifty gigaHertz (9 kHz–50 gHz), inclusive.

47. A wireless communication device for providing at least two communication interfaces, comprising:
   at least one antenna;
   at least a first computer communication interface component electrically associated with the antenna, the first computer communication interface component defining a first interface format and being a memory device; and
   at least a second computer communication interface component electrically associated with the antenna, the second computer communication interface component defining a second interface format, wherein the device can be used to establish wireless communication between at least one user terminal and at least one base station using one of the interface formats, wherein the first interface format is a flash memory format and the second interface format is selected from the group of formats comprising: universal serial bus (USB) format, Bluetooth wireless format, and ILink format, wherein the memory device has at least one chamfered surface.

48. A wireless communication device for providing at least two communication interfaces, comprising:
   at least one antenna;
   at least a first computer communication interface component electrically associated with the antenna, the first computer communication interface component defining a first interface format and being a memory device; and
   at least a second computer communication interface component electrically associated with the antenna, the second computer communication interface component defining a second interface format, wherein the device can be used to establish wireless communication between at least one user terminal and at least one base station using one of the interface formats, wherein the first interface format is a flash memory format and the second interface format is selected from the group of formats comprising: universal serial bus (USB) format, Bluetooth wireless format, and ILink format, wherein the memory device has a length of fifty millimeters (50 mm) and a width of twenty one and a half millimeters (21.5 mm).

49. A wireless communication device for providing at least two communication interfaces, comprising:
   at least one antenna;
   at least a first computer communication interface component electrically associated with the antenna, the first computer communication interface component defining a first interface format and being a memory device; and
   at least a second computer communication interface component electrically associated with the antenna, the second computer communication interface component defining a second interface format, wherein the device can be used to establish wireless communication between at least one user terminal and at least one base station using one of the interface formats, wherein the first interface format is a flash memory format and the second interface format is selected from the group of formats comprising: universal serial bus (USB) format, Bluetooth wireless format, and ILink format, wherein the flash memory device has ten connectors.

50. A device for effecting wireless communication between a user terminal and at least one base station, comprising:
   wireless transmitting means;
   first communication interface and flash memory means engageable with a user terminal for communicating IP data from the user terminal to the base station using the wireless transmitting means; and
   second communication interface means engageable with a user terminal for communicating IP data from the user terminal to the base station using the wireless transmitting means, the first and second communication interface means being contained on a housing separate from the user terminal, wherein the first communication interface and flash memory means is at least one flash memory card, the second communication interface means is at least one universal serial bus (USB) connector, and the wireless transmitting means is at least one wireless Internet packet (IP) transceiver, wherein the memory card has a chamfered surface.

51. A device for effecting wireless communication between a user terminal and at least one base station, comprising:
   wireless transmitting means;
   first communication interface and flash memory means engageable with a user terminal for communicating IP data from the user terminal to the base station using the wireless transmitting means; and
   second communication interface means engageable with a user terminal for communicating IP data from the user terminal to the base station using the wireless transmitting means, the first and second communication interface means being contained on a housing separate from the user terminal, wherein the first communication interface and flash memory means is at least one flash memory card, the second communication interface means is at least one universal serial bus (USB) connector, and the wireless transmitting means is at least one wireless Internet packet (IP) transceiver, wherein the memory card has a length of fifty millimeters (50 mm) and a width of twenty one and a half millimeters (21.5 mm).

52. A device for effecting wireless communication between a user terminal and at least one base station, comprising:
   wireless transmitting means;
   first communication interface and flash memory means engageable with a user terminal for communicating IP data from the user terminal to the base station using the wireless transmitting means; and
   second communication interface means engageable with a user terminal for communicating IP data from the user terminal to the base station using the wireless transmitting means, the first and second communication interface means being contained on a housing separate from the user terminal, wherein the first communication interface and flash memory means is at least one flash memory card, the second communication interface means is at least one universal serial bus (USB) connector, and the wireless transmitting means is at least one wireless Internet packet (IP) transceiver, wherein the flash memory card has at least ten connectors.

* * * * *